(12) United States Patent
Teyssier et al.

(10) Patent No.: US 9,047,092 B2
(45) Date of Patent: Jun. 2, 2015

(54) RESOURCE MANAGEMENT WITHIN A LOAD STORE UNIT

(71) Applicant: ARM LIMITED, Cambridge (GB)

(72) Inventors: Mélanie Emanuelle Lucie Teyssier, Sophia Antipolis Cedex (FR); Philippe Pierre Maurice Luc, Sophia Antipolis Cedex (FR); Albin Pierick Tonnerre, Sophia Antipolis Cedex (FR)

(73) Assignee: ARM Limited, Cambridge (GB)

( * ) Notice: Subject to any disclaimer, the term of this patent is extended or adjusted under 35 U.S.C. 154(b) by 227 days.

(21) Appl. No.: 13/724,094

(22) Filed: Dec. 21, 2012

(65) Prior Publication Data

US 2014/0181416 A1    Jun. 26, 2014

(51) Int. Cl.
*G06F 9/38* (2006.01)

(52) U.S. Cl.
CPC .............. *G06F 9/38* (2013.01); *G06F 2212/25* (2013.01)

(58) Field of Classification Search
CPC .............. G06F 12/0888; G06F 9/3804; G06F 9/3842–9/3844; G06F 12/0246; G06F 9/0844
USPC .......... 711/138, 167–169; 712/233–239, 214, 712/216–219, 225
See application file for complete search history.

(56) References Cited

U.S. PATENT DOCUMENTS

| | | | | |
|---|---|---|---|---|
| 5,740,406 A * | 4/1998 | Rosenthal et al. | ............. | 711/169 |
| 5,907,693 A * | 5/1999 | Fant et al. | ...................... | 712/208 |
| 5,978,907 A * | 11/1999 | Tran et al. | ...................... | 712/239 |
| 6,085,289 A * | 7/2000 | Thatcher et al. | ............... | 711/118 |
| 6,415,360 B1 * | 7/2002 | Hughes et al. | ................. | 711/139 |
| 6,473,837 B1 * | 10/2002 | Hughes et al. | ................. | 711/146 |
| 6,745,308 B2 * | 6/2004 | Frank et al. | .................... | 711/169 |
| 6,941,444 B2 * | 9/2005 | Fong | .............................. | 711/214 |
| 7,366,877 B2 * | 4/2008 | Augsburg et al. | ............. | 712/214 |
| 7,398,358 B2 * | 7/2008 | Dowling | ....................... | 711/140 |
| 7,587,566 B2 * | 9/2009 | Ballantyne et al. | ........... | 711/163 |
| 8,006,072 B2 * | 8/2011 | Cook et al. | .................... | 712/219 |
| 8,464,029 B2 * | 6/2013 | Day et al. | ....................... | 712/216 |
| 2002/0019927 A1 * | 2/2002 | Hondou | ........................ | 712/214 |
| 2005/0038979 A1 * | 2/2005 | Fischer et al. | ................ | 712/214 |
| 2005/0044319 A1 * | 2/2005 | Olukotun | ....................... | 711/118 |
| 2005/0120192 A1 * | 6/2005 | Akkary et al. | ................ | 712/220 |
| 2005/0132159 A1 * | 6/2005 | Jeddeloh | ........................ | 711/167 |
| 2006/0004967 A1 * | 1/2006 | Mithal et al. | .................. | 711/152 |
| 2007/0050588 A1 * | 3/2007 | Tabata et al. | .................. | 711/165 |
| 2008/0065870 A1 * | 3/2008 | Saruwatari | .................... | 712/235 |
| 2008/0104329 A1 * | 5/2008 | Gaither et al. | ................ | 711/138 |

(Continued)

OTHER PUBLICATIONS

Naini, A Dedicated Data Flow Architecture for Hardware Compilation. IEEE, International Conference on Proceeding of the Twenty-Second Annual Hawaii. Jan. 1989.*

(Continued)

*Primary Examiner* — Jared Rutz
*Assistant Examiner* — Khoa Doan
(74) *Attorney, Agent, or Firm* — Nixon & Vanderhye P.C.

(57) ABSTRACT

A load store pipeline 18 includes an issue queue 20 and load store circuitry 24. The load store circuitry 24 includes the plurality of access slot circuits 26 to 40. Dependency tracking circuitry 42, 44, 46, 48 serves to track a freeable number of access slot circuits 26 to 42 corresponding to the sum of access slot circuits that are empty and those processing data access instructions which have not bypassed any preceding data access instructions within the program execution order.

18 Claims, 4 Drawing Sheets

(56) References Cited

U.S. PATENT DOCUMENTS

| | | | |
|---|---|---|---|
| 2009/0031114 A1* | 1/2009 | Arakawa | 712/215 |
| 2009/0249033 A1* | 10/2009 | Greenhalgh et al. | 712/205 |
| 2010/0100670 A1* | 4/2010 | Jeddeloh | 711/105 |
| 2011/0173399 A1* | 7/2011 | Chen et al. | 711/154 |
| 2012/0079245 A1* | 3/2012 | Wang et al. | 712/208 |
| 2013/0042094 A1* | 2/2013 | Heller, Jr. | 712/228 |
| 2013/0054880 A1* | 2/2013 | Chang et al. | 711/103 |
| 2013/0111140 A1* | 5/2013 | Kitahara | 711/125 |
| 2013/0339671 A1* | 12/2013 | Williams et al. | 712/217 |
| 2014/0040595 A1* | 2/2014 | Tran | 712/32 |

OTHER PUBLICATIONS

Alfaro. The case for Single-Chip multiprocessor. UC San Diego 2002.*

* cited by examiner

RESOURCE MANAGEMENT WITHIN A LOAD STORE UNIT

BACKGROUND OF THE INVENTION

1. Field of the Invention

This invention relates to the field of data processing systems. More particularly, this invention relates to data processing systems having load store units for performing data access operations.

2. Description of the Prior Art

It is known to provide data processing systems which include load store units for handling data access operations. As an example, a load instruction or a store instruction will be dispatched to the load store unit and the load store unit will then perform a data access operation in response to that load instruction or store instruction. Data access operations can sometimes have a long latency, such as when the data is not cached and the data access has to be made to a main memory or an external memory. In order to improve the efficiency of the load store unit it is known to provide the load store unit with a plurality of access slot circuits. Each of these access slot circuits can be responsible for performing processing operations in respect of a given data access instruction. In this way, a load store unit may handle multiple data access instructions in parallel.

The efficiency of the load store unit and the data processing apparatus in general may be improved if it is able to support out-of-order processing. In such out-of-order processing, data access instructions may be sent to the load store unit for execution in an order different from the order in which they appear in the execution order of the program. A consequence of such out-of-order execution is that a data access instruction appearing first in the program execution order may be bypassed by a data access instruction later in the program execution order relative to the time at which they are issued from an issue queue of data access instructions awaiting issue to the load store unit. In this circumstance, a data access instruction which due to out-of-order processing overtakes another data access instruction becomes a bypassing data access instruction. The data access instruction which is overtaken becomes a bypassed data access instruction.

While supporting out-of-order processing of data access instructions can improve instruction throughput, it can lead to difficulties. As an example, a finite number of access slot circuits will be available within the load store unit. If all of these access slot circuits are busy performing data access operations on behalf of bypassing data access instructions, then it may not be possible to issue a bypassed data access instruction to the load store unit as sufficient access slot circuits are not available to accept it. If the bypassing data access instructions have a dependency upon the bypassed data access instructions such that they cannot be retired from the access slot circuits until the bypassed data access instruction has been executed, then a deadlock situation will arise. In order to prevent such deadlocks arising, it is possible to control issue of data access instructions to the load store unit such that a minimum number of access slot circuits always remain unused so as to allow issue of a bypassed data access instruction when it is ready to be issued. In this way, it can be guaranteed that the bypassed data access instruction can be issued and accordingly a deadlock may be avoided. A problem with this approach is that the requirement to maintain a minimum number of access slot circuits empty so as to accommodate a bypassed data access instruction when it is ready to be issued results in an inefficient use of the access slot circuit resources provided, i.e. access slot circuits are provided by the system, but deliberately not used for bypassing data access instructions which are ready to be issued and instead are held empty so as to guarantee their availability for a bypassed data access instruction.

SUMMARY OF THE INVENTION

Viewed from one aspect the present invention provides apparatus for processing data in response program instructions having a program execution order, said apparatus comprising:

issue queue circuitry configured to store a queue of program instructions to be issued for execution; and load store circuitry configured to perform data access operations in response to data access instructions issued from said issue queue circuitry; wherein said load store circuitry comprises a plurality of access slot circuits, each access slot circuit configured to perform an access operation corresponding to a data access instruction issued from said issue queue circuitry;

said issue queue circuitry is configured to permit issue of data access instructions to said load store circuitry to be performed by respective different ones of said plurality of access slot circuits in an order different from said program execution order such that a bypassing data access instruction is issued to said load store circuitry before a bypassed data access instruction is issued to said load store circuitry, said bypassed data access instruction having a position before said bypassing data access instruction within said program execution order and said bypassing data access instruction having a potential dependency upon said bypassed data access instruction;

said load store circuitry is configured to manage hazards due to potential dependency between a bypassing data access instruction and a bypassed data access instruction; and further comprising dependency tracking circuitry configured to track a freeable number of said plurality of access slot circuits including access slot circuits that are not performing access operations for bypassing data access instructions having a potential dependency upon one or more bypassed data access instructions and already free access slot circuits; wherein said issue control circuitry is coupled to said dependency tracking circuitry and is configured to prevent issue of any further bypassing data access instruction to said load store circuitry unless said freeable number is equal to or exceeds a minimum number.

The present technique recognises that a more relaxed constraint upon the use of the access slot circuits may be used while still ensuring that a deadlock situation does not arise. This more relaxed constraint is supported by dependency tracking circuitry which tracks a freeable number of access slot circuits that includes both the empty "currently unused" circuits together with those access slot circuits which are in use performing data access operations that are not dependent upon any bypassed data access instruction. These access slot circuits which are busy performing data access operations that are not dependent upon bypassed data access instructions are guaranteed to become free in due course, even if they are not free at present. This relaxed constraint increases the efficiency with which the provided access slot circuits may be utilised, e.g. fewer access slot circuits may support the same throughput of data access instructions.

When the freeable number does not equal or exceed the minimum number, then the issue queue circuitry may be configured to only issue a bypassed instruction that is first in the program execution order among all bypassed data access instructions. By ensuring the oldest bypassed data access instruction is issued in this circumstance ensures that forward progress in the program will be made and deadlock will be avoided.

The minimum number used may correspond to the number of access slot circuits required to perform any one bypassed data access instruction. Different data access instructions may require different numbers of access slot circuits. In order that the constraint based upon a freeable number can ensure that a deadlock does not arise, the freeable number should be sufficient to perform the data access operations associated with any bypassed data access instruction. As an example, an unaligned data access operation may require two access slot circuits, whereas more common aligned single data access instructions require only one access slot circuit. In order that the minimum number does not become too high, some embodiments which support multiple load instructions (e.g. a load instruction which performs a sequence of loads to a plurality of registers) or a multiple store instruction (a store operation from multiple registers to a sequence of memory addresses) may be such that the multiple load instructions and the multiple store instructions are not permitted to serve as bypassing data access instructions as they will consume too many of the access slot circuits.

The dependency tracking circuitry may be formed in a wide variety of different ways. In some embodiments, the dependency tracking circuitry may be configured to track which of the plurality of access slot circuits are performing access operations for bypassing data access instructions which have a potential dependency upon one or more bypassed data access instructions.

In addition to tracking that an access slot circuit is performing an access operation that is potentially dependent upon one or more bypassed data access instructions, in some embodiments the dependency tracking circuitry may be configured to track upon which bypassed data access instructions the bypassing data access instruction for a given access slot circuitry has a potential dependency. In this way, when that bypassed data access instruction is issued such that the dependency is removed, the clearing of this dependency can be noted by the dependency tracking circuitry.

In order to facilitate such dependency tracking, the dependency tracking circuitry may be configured to store for each of the access slot circuits a dependency bit for each issue queue position and to set the dependency bit to a given value to indicate that the issue queue position corresponds to a bypassed data access instruction upon which a bypassing data access instruction for that access slot circuit has a potential dependency.

Viewed from another aspect the present invention provides apparatus for processing data in response program instructions having a program execution order, said apparatus comprising:

issue queue means for storing a queue of program instructions to be issued for execution; and load store means for performing data access operations in response to data access instructions issued from said issue queue means; wherein said load store means comprises a plurality of access slot circuits means for performing respective access operations each corresponding to a data access instruction issued from said issue queue means;

said issue queue means permits issue of data access instructions to said load store means to be performed by respective different ones of said plurality of access slot means in an order different from said program execution order such that a bypassing data access instruction is issued to said load store means before a bypassed data access instruction is issued to said load store means, said bypassed data access instruction having a position before said bypassing data access instruction within said program execution order and said bypassing data access instruction having a potential dependency upon said bypassed data access instruction;

said load store means manages hazards due to potential dependency between a bypassing data access instruction and a bypassed data access instruction; and further comprising dependency tracking means for tracking a freeable number of said plurality of access slot means including access slot means that are not performing access operations for bypassing data access instructions having a potential dependency upon one or more bypassed data access instructions and already free access slot means; wherein said issue control means is coupled to said dependency tracking means and is configured to prevent issue of any further bypassing data access instruction to said load store means unless said freeable number is equal to or exceeds a minimum number.

Viewed from a further aspect the present invention provides a method of processing data in response program instructions having a program execution order, said method comprising the steps:

storing within issue queue circuitry a queue of program instructions to be issued for execution; and performing data access operations with load store circuitry in response to data access instructions issued from said issue queue circuitry; wherein said load store circuitry comprises a plurality of access slot circuits, each access slot circuit configured to perform an access operation corresponding to a data access instruction issued from said issue queue circuitry; further comprising the steps of:

issuing data access instructions to said load store circuitry to be performed by respective different ones of said plurality of access slot circuits in an order different from said program execution order such that a bypassing data access instruction is issued to said load store circuitry before a bypassed data access instruction is issued to said load store circuitry, said bypassed data access instruction having a position before said bypassing data access instruction within said program execution order and said bypassing data access instruction having a potential dependency upon said bypassed data access instruction;

managing hazards due to potential dependency between a bypassing data access instruction and a bypassed data access instruction;

tracking a freeable number of said plurality of access slot circuits including access slot circuits that are not performing access operations for bypassing data access instructions having a potential dependency upon one or more bypassed data access instructions and already free access slot circuits; and preventing issue of any further bypassing data access instruction to said load store circuitry unless said freeable number is equal to or exceeds a minimum number.

The above, and other objects, features and advantages of this invention will be apparent from the following detailed description of illustrative embodiments which is to be read in connection with the accompanying drawings.

DESCRIPTION OF THE EMBODIMENTS

Figure 1:
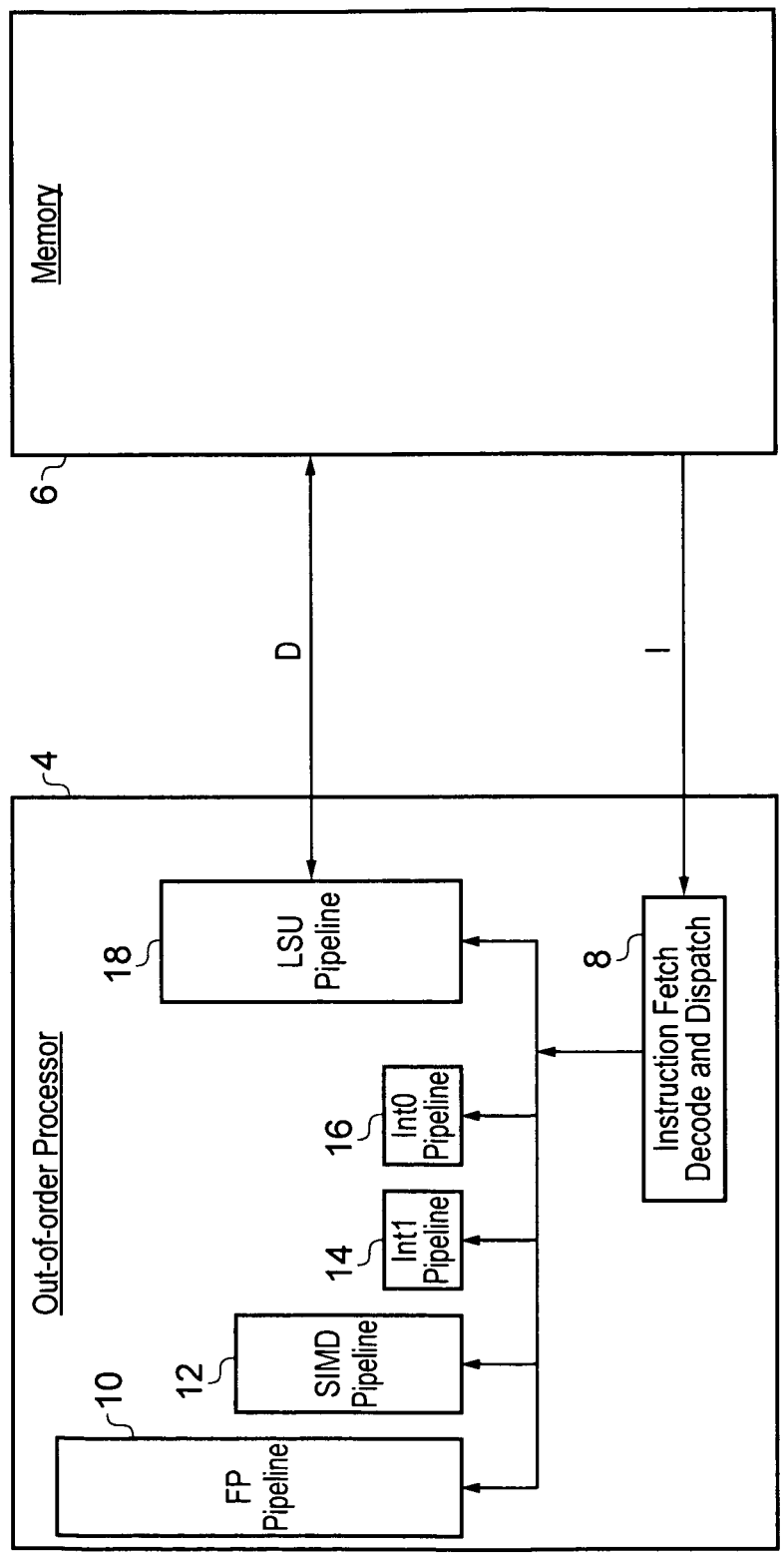
FIG. 1 schematically illustrates an out-of-order processor and a memory.

FIG. 1 schematically illustrates a data processing system 2 including an out-of-order processor core 4 coupled to a memory 6. The processor core 4 includes circuitry 8 performing instruction fetch, decode and dispatch operations. Multiple processing pipelines are provided into which program instructions are dispatched. Each of these pipelines 10, 12, 14, 16, 18 includes an issue queue from which program instructions are issued when they are ready and when resources are available within the associated pipeline 10, 12, 14, 16, 18.

The instruction processing pipelines include a load store unit pipeline 18 which is responsible for performing data access operations in response to data access instructions. These data access operations may include load operations and store operations. Furthermore, these operations may be aligned or unaligned. It is also possible that load multiple operations and store multiple operations are supported. The data access operations supported may, for example, be of the types supported by the ARM instruction set (as provided by the processors designed by ARM Limited of Cambridge, England.

Figure 2:
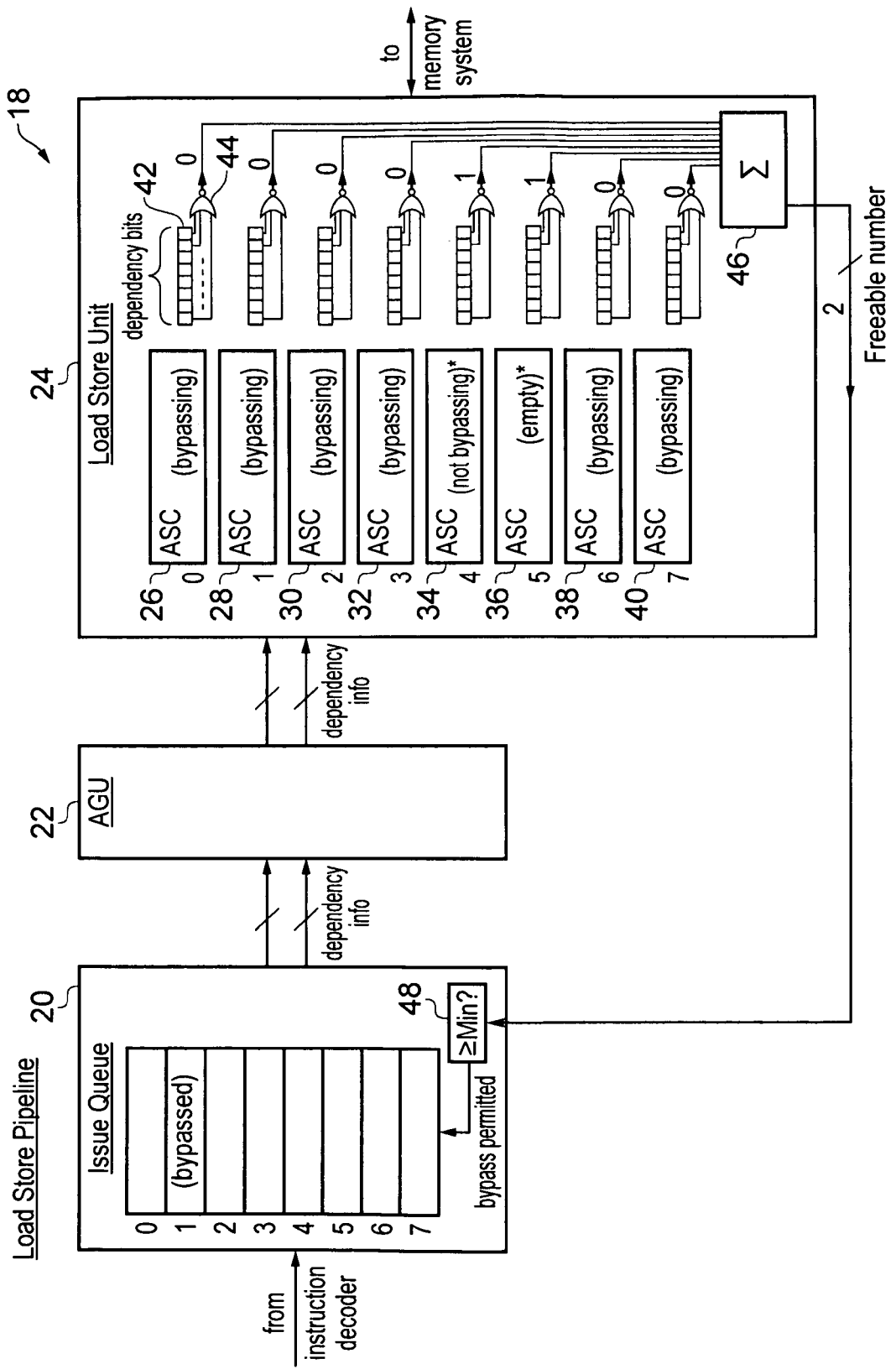
FIG. 2 schematically illustrates part of a load store pipeline.

FIG. 2 schematically illustrates a portion of the load store pipeline 18 which serves as load store circuitry. In particularly, the load store pipeline includes an issue queue 20 for data access instructions, an address generator unit 22 and a load store unit 24. The load store unit 24 includes, in this example embodiment, eight access slot circuits 26, 28, 30, 32, 34, 36, 38, 40. Each of the access slot circuits 26 to 40 has an associated dependency bit register 42 which stores eight dependency bits.

The issue queue 20 stores up to eight data access instructions awaiting issue. The data access instructions are dispatched to the issue queue 20 and wait there until both all of the state they require before they can issue is available and the resources they require to be performed is available. Each of the slots within the issue queue 20 has an associated issue queue identifier. The dependency bits within the dependency registers 42 each correspond to a respective instruction queue identify position. The dependency bits serve to indicate that a data access instruction currently being performed by the associated access slot circuit 26 to 40 has a dependency upon a bypassed data access instruction stored within the instruction queue 20 with the instruction queue identifier corresponding to that bit position. Thus, the dependency registers 42 serve to track upon which bypassed data access instructions within the instruction queue 20 the associated bypassing data access instruction within that access slot circuit 26 to 40 has a potential dependency.

It will be appreciated that the potential dependency indicated by the dependency bits may not be a true dependency. The dependency bit indicates that there is the possibility of a dependency, but when the addresses are resolved for the bypassed data access instructions it may be that no dependency in fact exists. Alternatively, it is possible that when the bypassed data access instruction has its addresses or other characteristics resolved it may be that the dependency is real in which case it can be handled by other mechanisms (not illustrated) within the load store pipeline and need not be tracked by the dependency bits 42. The dependency bits 42 serve to track potential dependencies used to control issue of bypassing data access instructions so as to ensure a minimum freeable number of access slot circuits is maintained at any given time so as to avoid potential deadlock rather than seeking to provide a complete dependency and hazard tracking mechanism.

When a data access instruction is issued from the issue queue 20 to the address generation unit 22, it is accompanied by dependency information indicating which, if any, program instructions earlier in the program execution order than the issued data access instruction are bypassed data access instructions relative to that issued data access instruction.

The address generation unit 22 serves to generate address values which are used by the load store unit 24. The address generation unit 22 also forwards the dependency information it received for a data access instruction from the issue queue 20 indicating bypassed data access instructions for the data access instruction concerned that is being passed to the load store unit 24.

The dependency information received at the load store unit 24 is loaded into the dependency register 42 of the access slot circuit 26 to 42 into which the instruction is loaded and which will be responsible for performing the data access operations associated with that data access instruction. A newly received data access instruction at the load store unit 24 will also include an indication of from which of the slots within the issue queue 20 it originated. This information may be used to clear any associated dependency bits within the dependency registers 42 for bypassing data access instructions relative to that newly received instruction. Thus, bypassing data access instructions with a set dependency bit indicating a potential dependency upon the newly received data access instruction may have that bit cleared as they no longer have such a potential dependency, at least in respect to access slot circuitry allocation as managed by the dependency bits and the mechanism described herein.

The dependency bits from each of the dependency registers 42 are supplied to a respective eight-bit OR gate 44 which provides an inverted output. Thus, the output of the OR gate 44 will be high if none of the dependency bits within the associated dependency register 42 is set, i.e. either the associated access slot circuit 26 to 42 is not a bypassing data access instruction or the associated access slot circuit 26 to 42 is currently empty. In the situation illustrated in FIG. 2 the current state is that the access slot circuit 34 is processing a data access instruction which is not a bypassing data access instruction and the access slot circuit 36 is currently empty (not currently processing any data access instruction). Accordingly, the outputs from two of the OR gates 42 are high.

A summing circuit 46 serves to sum the high signals received from the OR gates 44 and generates the freeable number which is supplied to the issue queue 20. In the current situation the freeable number is two. It will be appreciated that the freeable number represents both the number of empty access slot circuits summed with the number of access slot circuits which data access instructions which are not bypassing data instructions (i.e. do not have a potential dependency upon any bypassed data access instruction currently held within the instruction queue 20). Thus, the access slot circuits which are busy, but are not processing bypassing data access instructions, contribute to the freeable number and thus contribute to the guaranteed resource that can prevent deadlock by ensuring that a bypassed data access instruction always will at some stage have sufficient access slot circuits in which it may be received and processed. Thus, the number of access slot circuits which need to be held empty may on average be reduced thus making more efficient use of the access slot circuits 26 to 40.

The freeable number which is fed back to the issue queue 20 is supplied to a comparison circuit 48 which compares the freeable number received to a minimum number. If the freeable number is greater than or equal to the minimum number, then the comparison circuit 48 generates a signal which indicates that bypassing is permitted, i.e. bypassing data access instructions may be issued form the instruction queue 20. If the bypass permitted signal is not asserted, then bypassing is not permitted and only the currently oldest bypassed data access instruction held within the instruction queue 20 may be issued when it is ready.

In this example, the minimum number is two as this corresponds to the number of access slot circuits 26 to 40 which is required to handle an unaligned data access. Load multiple instructions and store multiple instructions are not permitted to serve as bypassing data access instructions.

Figure 3:
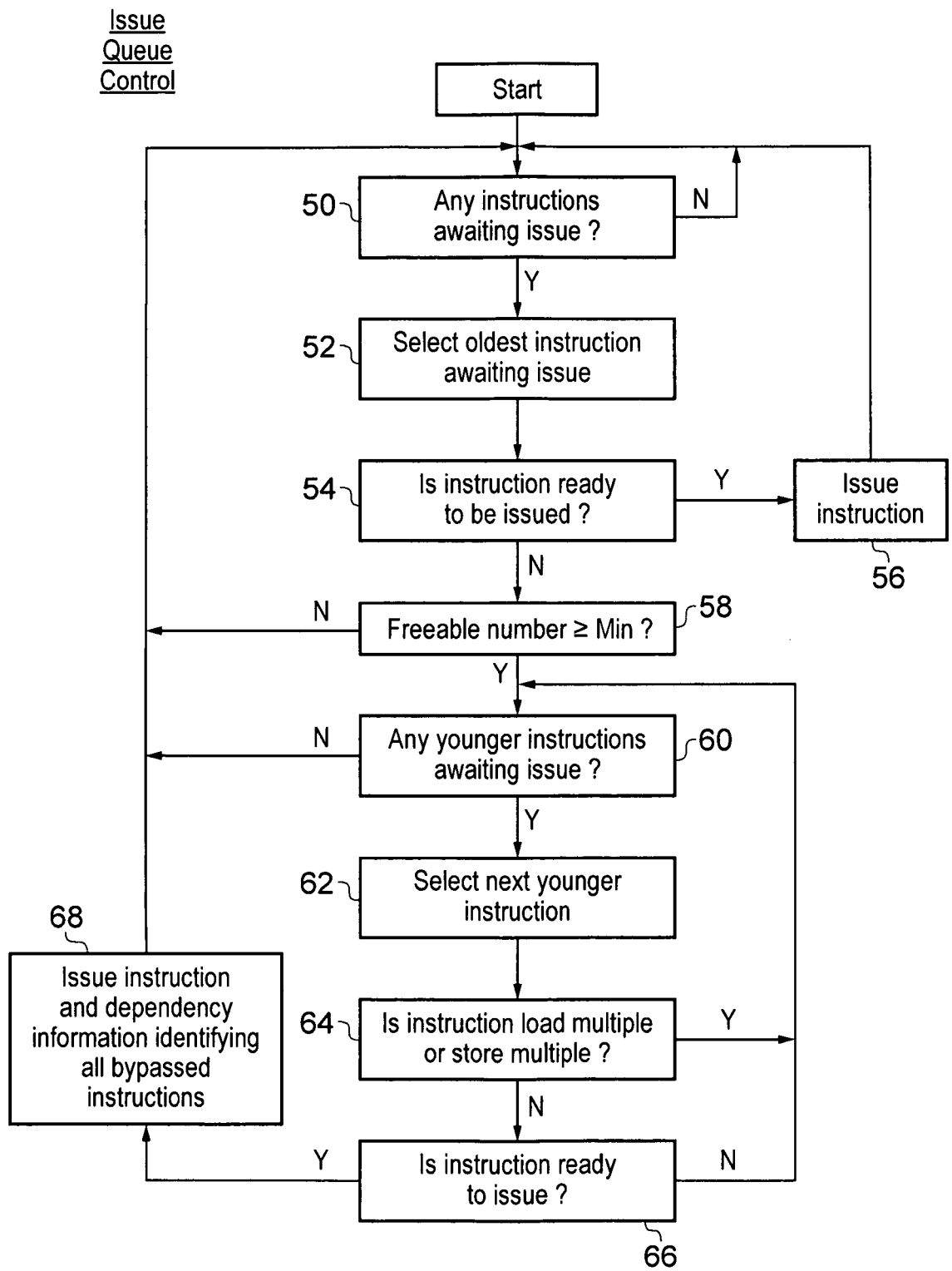
FIG. 3 is a flow diagram schematically illustrating issue queue control.

FIG. 3 is a flow diagram schematically illustrating issue queue control as performed by the issue queue 20. At step 50 processing waits until there are any instructions awaiting issue. When there are one or more instructions awaiting issue, then step 52 selects the oldest instruction awaiting issue. Step 54 then determines whether or not the oldest instruction is ready to be issued (e.g. all its required parameters are available). If the instruction is ready for issue, then at step 56 the instruction is issued from the instruction queue 20 and processing returns to step 50. For the oldest instruction within the issue queue as selected at step 52, there is no need to determine whether or not the freeable number currently exceeds the minimum threshold number.

If the determination at step 54 is that the oldest instruction is not ready to be issued, then processing proceeds to step 58 where a determination is made as to whether or not the freeable number currently exceeds or is equal to the threshold minimum number. If the freeable number does not meet this test, then processing returns to step 50. If the freeable number does meet this test, then this corresponds to bypassing being permitted.

If bypassing is permitted, then processing proceeds to step 60 where a determination is made as to whether or not there are any younger instructions in the issue queue awaiting issue. If there are no such younger instructions which can serve as bypassing instructions, then processing again returns to step 50. If there are such younger instructions awaiting issue, then step 62 serves to select the next youngest of these compared to the currently selected instruction (i.e. the one selected at step 52). Step 64 then determines whether or not the selected instruction is a load multiple or a store multiple instruction. If the selected instruction is a load multiple or a stored multiple, then such an instruction is not permitted to be a bypassing data accessing instruction and processing is returned to step 60. If a selected instruction is not a load multiple or a store multiple, then processing proceeds to step 66.

If at step 66 the instruction is determined to be ready to issue, then processing proceeds to step 68. Step 68 issues the instruction (which will be a bypassing data access instruction (together with dependency information identifying all bypassed instructions relative to the instruction being issued)). The dependency information is passed to the address generation unit 22 and then on to the load store unit 24 where it is used to populate the dependency register 42. If the determination at step 66 is that the instruction is not ready to issue, then again processing returns to step 60.

Figure 4:
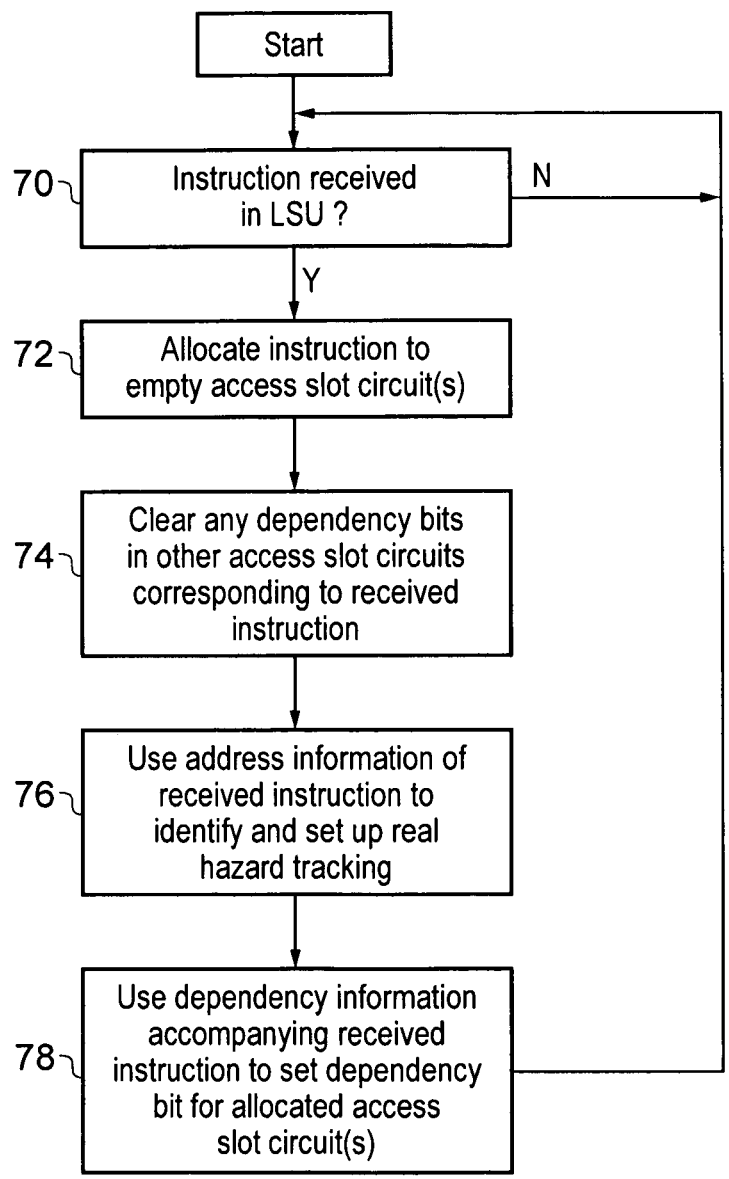
FIG. 4 is a flow diagram schematically illustrating dependency tracking.

FIG. 4 is a flow diagram schematically illustrating dependency tracking which is performed within the load store unit 24. Step 70 waits until an instruction is received in the load store unit 24. Step 72 then allocates the instruction to one or more currently empty access slot circuits 26 to 40 as required for that received instruction. Step 74 reads the instruction queue identifier for the received instruction and clears any dependency bits in other access slot circuits corresponding to the received instruction. Step 76 uses address information of the received instruction to identify and set up any real hazard tracking associated with that received instruction. The dependency bits and the mechanisms described herein are used to avoid deadlock arising which prevents instructions being issued from the issue queue 20 to the load store unit 24 due to a lack of available access slot circuits 26 to 40 within the load store unit 24. Further real hazards may or may not arise.

Examples of such real hazards are write after read, write after write, read after write and read after read (in multiprocessor systems), as will be familiar to those in this technical field. There are a variety of known mechanisms to deal with such real hazards within the load store unit 24. Such known hazard tracking mechanisms can be used to track and/or resolve the hazards identified so as to prevent erroneous operation.

After any real hazards have been identified and their tracking set up in step 76, step 78 serves to use the received dependency information to set the dependency bits within the dependency register 42 of the access slot circuit(s) which were allocated to the received instruction at step 72.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data in response program instructions having a program execution order, said apparatus comprising:

issue queue circuitry configured to store a queue of program instructions to be issued for execution; and load store circuitry configured to perform data access operations in response to data access instructions issued from said issue queue circuitry; wherein said load store circuitry comprises a plurality of access slot circuits, each access slot circuit configured to perform an access operation corresponding to a data access instruction issued from said issue queue circuitry;

said issue queue circuitry is configured to permit issue of data access instructions to said load store circuitry to be performed by respective different ones of said plurality of access slot circuits in an order different from said program execution order such that a bypassing data access instruction is issued to said load store circuitry before a bypassed data access instruction is issued to said load store circuitry, said bypassed data access instruction having a position before said bypassing data access instruction within said program execution order and said bypassing data access instruction having a potential dependency upon said bypassed data access instruction;

said load store circuitry is configured to manage hazards due to potential dependency between a bypassing data access instruction and a bypassed data access instruction; and further comprising dependency tracking circuitry configured to track a freeable number of said plurality of access slot circuits including access slot circuits that are not performing access operations for bypassing data access instructions having a potential dependency upon one or more bypassed data access instructions and already free access slot circuits; wherein said issue control circuitry is coupled to said dependency tracking circuitry and is configured to prevent issue of any further bypassing data access instruction to said load store circuitry unless said freeable number is equal to or exceeds a minimum number, wherein said freeable number is a sum of any access slot circuits not performing access operations and any access slot circuits that are performing access operations for data access instruction that are not bypassing data access instructions.

2. Apparatus as claimed in claim 1, wherein said issue queue circuitry is configured such that, when said freeable number does not equal or exceed said minimum number, only a bypassed data access instruction first in said program execution order among all bypassed data access instructions is permitted to issue to said load store circuitry.

3. Apparatus as claimed in claim 1, wherein said minimum number corresponds to a number of said plurality of access slot circuits required to perform any one bypassed data access instruction yet to be issued from said issue queue circuitry to said load store circuitry.

4. Apparatus as claimed in claim 3, wherein unaligned data access instructions requiring two access slot circuits to be performed can serve as bypassed data access instructions and said minimum number is two.

5. Apparatus as claimed in claim 1, wherein said dependency tracking circuitry is configured to track which of said plurality of access slot circuits are performing access operations for bypassing data access instructions having a potential dependency upon one or more bypassed data access instructions.

6. Apparatus as claimed in claim 5, wherein dependency tracking circuitry is configured to track for each of said plurality of access slot circuits performing access operations for a bypassing data access instruction, any bypassed data access instructions program upon which said bypassing data access instruction has a potential dependency.

7. Apparatus as claimed in claim 6, wherein said issue queue circuitry is configured to associate an issue queue position with each program instruction awaiting issue and said dependency tracking circuitry is configured to store for each of said plurality of access slot circuits a dependency bit for each issue queue position and to set said dependency bit a given value to indicate that said issue queue position corresponds to a bypassed data access instruction upon which a bypassing data access instruction for that access slot circuit has a potential dependency.

8. Apparatus as claimed in claim 7, wherein said freeable number is number of elements within a union of access slot circuits within said plurality of access slot circuits not performing access operations and access slots within said plurality of access slots that have no dependency bits set to said given value.

9. Apparatus as claimed in claim 1, wherein said issue queue circuitry is configured to not permit any of a load multiple instruction and a store multiple instruction to serve as a bypassing data access instruction.

10. Apparatus for processing data in response program instructions having a program execution order, said apparatus comprising:

issue queue means for storing a queue of program instructions to be issued for execution; and load store means for performing data access operations in response to data access instructions issued from said issue queue means; wherein said load store means comprises a plurality of access slot circuits means for performing respective access operations each corresponding to a data access instruction issued from said issue queue means;

said issue queue means permits issue of data access instructions to said load store means to be performed by respective different ones of said plurality of access slot means in an order different from said program execution order such that a bypassing data access instruction is issued to said load store means before a bypassed data access instruction is issued to said load store means, said bypassed data access instruction having a position before said bypassing data access instruction within said program execution order and said bypassing data access instruction having a potential dependency upon said bypassed data access instruction;

said load store means manages hazards due to potential dependency between a bypassing data access instruction and a bypassed data access instruction; and further comprising dependency tracking means for tracking a freeable number of said plurality of access slot means including access slot means that are not performing access operations for bypassing data access instructions having a potential dependency upon one or more bypassed data access instructions and already free access slot means; wherein said issue control means is coupled to said dependency tracking means and is configured to prevent issue of any further bypassing data access instruction to said load store means unless said freeable number is equal to or exceeds a minimum number, wherein said freeable number is a sum of any access slot circuits not performing access operations and any access slot circuits that are performing access operations for data access instruction that are not bypassing data access instructions.

11. A method of processing data in response program instructions having a program execution order, said method comprising the steps:

storing within issue queue circuitry a queue of program instructions to be issued for execution; and performing data access operations with load store circuitry in response to data access instructions issued from said issue queue circuitry; wherein said load store circuitry comprises a plurality of access slot circuits, each access slot circuit configured to perform an access operation corresponding to a data access instruction issued from said issue queue circuitry; further comprising the steps of:

issuing data access instructions to said load store circuitry to be performed by respective different ones of said plurality of access slot circuits in an order different from said program execution order such that a bypassing data access instruction is issued to said load store circuitry before a bypassed data access instruction is issued to said load store circuitry, said bypassed data access instruction having a position before said bypassing data access instruction within said program execution order and said bypassing data access instruction having a potential dependency upon said bypassed data access instruction;

managing hazards due to potential dependency between a bypassing data access instruction and a bypassed data access instruction;

tracking a freeable number of said plurality of access slot circuits including access slot circuits that are not performing access operations for bypassing data access instructions having a potential dependency upon one or more bypassed data access instructions and already free access slot circuits; and preventing issue of any further bypassing data access instruction to said load store circuitry unless said freeable number is equal to or exceeds a minimum number, wherein said freeable number is a sum of any access slot circuits not performing access operations and any access slot circuits that are performing access operations for data access instruction that are not bypassing data access instructions.

12. A method as claimed in claim 11, wherein when said freeable number does not equal or exceed said minimum number, only a bypassed data access instruction first in said program execution order among all bypassed data access instructions is permitted to issue to said load store circuitry.

13. A method as claimed in claim 11, wherein said minimum number corresponds to a number of said plurality of access slot circuits required to perform any one bypassed data access instruction yet to be issued from said issue queue circuitry to said load store circuitry.

14. A method as claimed in claim 13, wherein unaligned data access instructions requiring two access slot circuits to be performed can serve as bypassed data access instructions and said minimum number is two.

15. A method as claimed in claim 11, comprising tracking which of said plurality of access slot circuits are performing access operations for bypassing data access instructions having a potential dependency upon one or more bypassed data access instructions.

16. A method as claimed in claim 15, comprising tracking for each of said plurality of access slot circuits performing access operations for a bypassing data access instruction, any bypassed data access instructions program upon which said bypassing data access instruction has a potential dependency.

17. A method as claimed in claim 16, comprising associating an issue queue position with each program instruction awaiting issue and said storing for each of said plurality of access slot circuits a dependency bit for each issue queue position and to set said dependency bit a given value to indicate that said issue queue position corresponds to a bypassed data access instruction upon which a bypassing data access instruction for that access slot circuit has a potential dependency.

18. A method as claimed in claim 17, wherein said freeable number is number of elements within a union of access slot circuits within said plurality of access slot circuits not performing access operations and access slots within said plurality of access slots that have no dependency bits set to said given value.

* * * * *